(12) United States Patent
Ravishankar et al.

(10) Patent No.: US 6,271,311 B1
(45) Date of Patent: Aug. 7, 2001

(54) ETHYLENE α-OLEFIN ELASTOMERIC POLYMER COMPOSITIONS HAVING IMPROVED EXTRUSION PROCESSIBILITY

(75) Inventors: Periagaram S. Ravishankar, Kingwood; Narayanaswami Raja Dharmarajan, Houston, both of TX (US)

(73) Assignee: Exxon Mobil Chemical Patents Inc., Houston, TX (US)

( * ) Notice: Subject to any disclaimer, the term of this patent is extended or adjusted under 35 U.S.C. 154(b) by 0 days.

(21) Appl. No.: 09/426,494

(22) Filed: Oct. 26, 1999

Related U.S. Application Data

(60) Provisional application No. 60/106,158, filed on Oct. 29, 1998.

(51) Int. Cl.[7] ............................ C08L 23/00; C08L 23/04; C08L 23/16; H01J 9/00
(52) U.S. Cl. ........................ 525/191; 525/240; 361/271; 361/437; 361/500
(58) Field of Search .................................. 525/191, 240; 361/271, 500, 437

(56) References Cited

U.S. PATENT DOCUMENTS

| | | | |
|---|---|---|---|
| 5,096,867 | 3/1992 | Canich | 502/103 |
| 5,198,401 | 3/1993 | Turner et al. | 502/155 |
| 5,241,025 | 8/1993 | Hlatky et al. | 526/129 |
| 5,387,568 | 2/1995 | Ewen et al. | 502/104 |
| 5,698,650 | 12/1997 | Jourdain et al. | 526/283 |

FOREIGN PATENT DOCUMENTS

| | | |
|---|---|---|
| 0 277 003 A1 | 8/1988 | (EP) . |
| 0 277 004 A1 | 8/1988 | (EP) . |
| 0 532 764 A1 | 3/1993 | (EP) . |
| 0 855 413 A1 | 7/1998 | (EP) . |
| WO 91/09882 | 7/1991 | (WO) . |
| WO 92/00333 | 1/1992 | (WO) . |
| WO 93/11172 | 6/1993 | (WO) . |
| WO 94/03506 | 2/1994 | (WO) . |

*Primary Examiner*—Nathan M. Nutter
(74) *Attorney, Agent, or Firm*—Frank E. Reid; Stephen D. Prodnuk

(57) ABSTRACT

Extruded shapes, profiles and parts in general based on an ethylene, alpha-olefin elastomeric polymer are manufactured utilizing a tailored approach to polymerization, leading to a polymer that delivers all of the benefits of metallocene based polymers, but without the drawbacks. Additionally, the ethylene, alpha-olefin elastomeric polymer has a broader molecular weight distribution than generally available from metallocene catalyzed elastomeric polymers.

15 Claims, 1 Drawing Sheet

ETHYLENE α-OLEFIN ELASTOMERIC POLYMER COMPOSITIONS HAVING IMPROVED EXTRUSION PROCESSIBILITY

RELATED APPLICATIONS

This application claims priority from an earlier filed application 60/106,158 filed Oct. 29, 1998.

TECHNICAL FIELD

Embodiments of the present invention generally pertain to the field of extruded elastomeric polymers. More particularly, the present invention is directed to elastomeric polymers that exhibit improved extrudability when compounded to form a useful precursor for extrudable materials. These elastomeric polymers are generally of the ethylene, alpha-olefin type made employing metallocene type catalysts.

BACKGROUND

Ethylene α-olefin elastomeric polymers (EP) have been widely used in extrusion applications such as electrical insulation for decades. These products are expected to provide an extrusion surface free of melt fracture. While this can be accomplished readily by the introduction of long chain branches in an EPDM through the diene, copolymers have to rely on other structural features. For example, use of multi-sited Ziegler-Natta catalyst will provide a very broad molecular weight distribution (MWD) (Mw/Mn>20) suitable for extrusion processing.

Metallocene or single sited catalyst produced elastomeric polymers will generally have a draw back in processability when extruded compared to the previously used elastomeric polymers based on multi-sited Ziegler-Natta produced elastomeric polymers. This drawback stems from the narrow MWD (Mw/Mn about 2), characteristic of such polymers. This MWD effect manifests itself through a lack of shear sensitivity, i.e., shear sensitivity being generally lower viscosity at higher shear rates.

The challenge in providing a metallocene catalyzed elastomeric polymer, with its attendant benefits, to the extrusion and/or electrical industry, is that these materials are generally known by those of ordinary skill in the art as narrow CD, narrow MWD elastomeric polymers. Based on such a characterization, those of ordinary skill in the art would not tend to make these metallocene catalyzed elastomeric polymers their choice for extrusion processes, because to do so would be to select a material whose characteristics are opposed to those outlined above as fitting extrusion processes.

There is a commercial need, therefore, for a metallocene catalyzed elastomeric polymer material which, when compounded, can provide a compound with processability or extrudability equal to a Ziegler-Natta (Z-N) analog.

SUMMARY

We have discovered that metallocene catalyzed ethylene, alpha-olefin, diene elastomeric polymers, when produced using an unusual reactor configuration, can exhibit a relatively broad molecular weight distribution which will provide processability or extrudability equal to or better than a Z-N catalyzed analog, and substantially better than a conventional metallocene produced elastomeric polymer. This result, while desirable, is unexpected and surprising. We will refer to this reactor configuration as tailoring. This tailoring has been applied to the conventional Z-N catalysts and their elastomeric polymer products. For tailoring to work, molecular weights that are substantially higher than the average molecular weight must be synthesized as a small part of the polymer backbone. Such higher molecular weights as part of the backbone are generally quite accessible with conventional Z-N catalysts, because for instance, in the second reactor of a series reactor scheme a catalyst charged in the first reactor, due to its short life, will have expired or nearly so in the second reactor. In such a catalyst-starved second reactor the catalyst system makes very high molecular weight segments, resulting in the desired polymer configuration. By contrast, metallocene catalysts are much longer lived than conventional Z-N vanadium catalysts, effectively preventing the use of such a straight forward approach that is conveniently used in the polymerization of certain Z-N based polymers.

A reactor setup which includes little to no chain transfer agent in a first reactor is instead a method of accomplishing a high molecular weight portion, with substantial amounts of chain transfer agent in a second or subsequent reactor. The resulting molecular weight distribution shown in FIG. 1 is surprisingly similar to the MWD of a similarly tailored vanadium (an example of Ziegler-Natta type) catalyst produced elastomeric polymer.

BRIEF DESCRIPTION OF THE DRAWINGS

These and other features, aspects, and advantages of the present invention will become better understood with reference with the following description, appended claims, and accompanying drawings where:

DESCRIPTION

Figure 1:
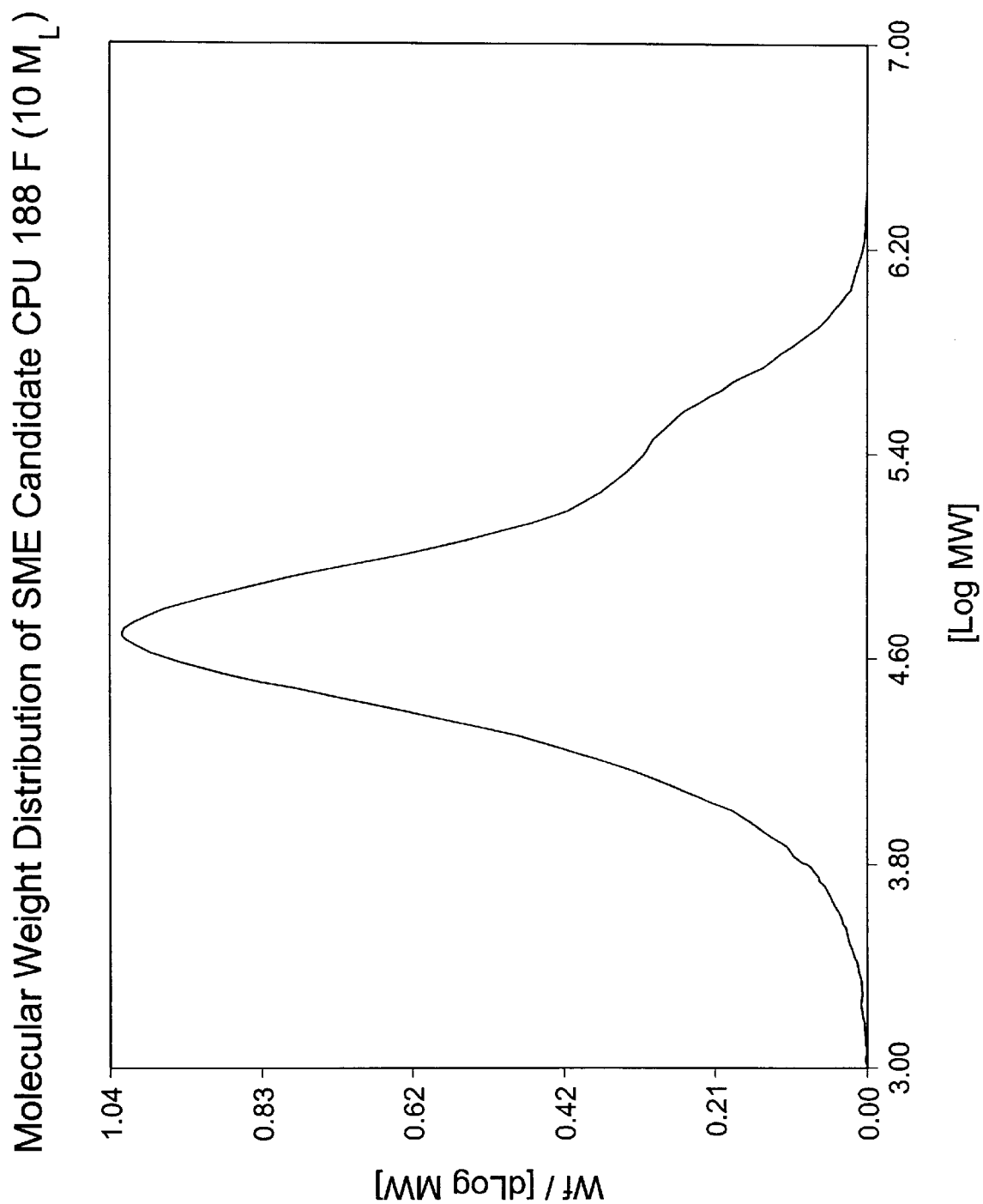
FIG. 1 shows the molecular weight distribution of embodiments of the present invention.

Various embodiments of our invention concern certain classes of ethylene, alpha-olefin elastomeric polymers, compounds made therefrom, formed articles made from the compounds and their uses. These elastomeric polymers have unique characteristics which make them well suited for use in certain applications. Electrical insulation, other extrusion compounds, and the like made based upon these elastomeric polymers, exhibit improved processability, while maintaining the advantages of metallocene based elastomeric polymers. Some of the benefits of metallocene catalyzed elastomers include high catalyst activity, leading to lower cost; lack of need for the removal of catalyst residues; broader range of compositions and range of alpha olefins not accessible to Z-N polymerization. A detailed description of certain preferred metallocene catalyst produced elastomeric polymers having improved processability in extrusion processes that are within the scope of our invention, preferred methods of producing the elastomers, and the preferred applications of the extruded parts, follow.

Those skilled in the art will appreciate the numerous modifications to these preferred embodiments can be made without departing from the scope of the invention. For example, although series reactor schemes utilizing little or no chain transfer agent in a first reactor, and substantial amounts of chain transfer agent in a second or subsequent reactor are used to exemplify the attributes of the elastomeric polymers of the present invention, the elastomeric polymers may be produced in numerous other reactor schemes such as series reactors in parallel, several reactors in series and the like. To the extent that our description is specific, this is solely for the purpose of illustrating preferred embodiments of our invention and should not be taken as limiting our invention to these specific embodiments. Blends of compositions made in single reactors, having the attributes thereof are also contemplated as part of this invention.

The use of subheadings in the description is intended to assist the reader and is not intended to limit the scope of our invention in any way.

INTRODUCTION

Conventional Ziegler-Natta (Z-N) catalyzed ethylene, α-olefin, non-conjugated diene elastomeric polymers generally are found to have both broad ethylene compositional distribution (CD) and broad molecular weight distributions, generally due to the fact that the Z-N catalysts have multiple catalyst sites. This broad distribution of molecular weights allows for reduction of viscosity with shear (shear thinning) and generally leads to smooth extrudates.

To make use of metallocene catalyzed ethylene, α-olefin elastomeric polymers which have the aforementioned benefits, substantial changes to such polymers must be achieved. These changes are due to the fact that the single sited metallocene catalysts normally or naturally produce narrow CD and narrow MWD polymers, a direct contrast to these same parameters exhibited by Z-N catalyzed elastomeric polymers.

Tailoring, basically a force fitting of a polymer into a configuration to solve a particular problem, is known. However, efforts to tailor the MWD in the past have been confounded with the presence of long chain branches (LCB), which by themselves render the polymer processible. Therefore the two challenges that need to be addressed for metallocene catalyzed ethylene, alpha olefin elastomeric polymers is (i) how to tailor and (ii) will tailoring, in the absence of LCB, provide improved extrusion processing? For instance, for tailoring the MWD, a much higher molecular weight fraction must be synthesized as a small part of the polymer backbone. In conventional Z-N catalysis or polymerization, this is normally accomplished by the use of a second or subsequent reactor in a series reactor scheme, by feeding a monomer/catalyst mixture from a first or previous reactor to the second or subsequent reactor. Due to the relatively short life of a Z-N catalyst, the reaction in the second or subsequent reactor is "catalyst starved", and the polymerization in the second or subsequent reactor makes a very high molecular weight, delivering the desired tailoring or molecular configuration. With metallocene catalysis, the catalysts are much longer lived, so such a solution to the tailoring problem is generally not possible.

Such tailoring demanded a different solution. Unexpectedly and surprisingly, we have found that this can be accomplished by reversing the order in which the low and high molecular weight fractions are produced. For example, through the choice of metallocene catalyst and control of chain transfer agent, a very high molecular weight fraction can be made in the first reactor. This effluent from the first reactor is then further polymerized in a second reactor where, copious amounts of a chain transfer agent can be added or other factors that influence molecular weight of polymer made in that reactor can be controlled such that a substantially lower molecular weight is made therein. This type of tailoring is not obvious to those trained in the art based on previous tailoring techniques because the options to control molecular weight in the second reactor have been limited for conventional tailoring using Z-N catalysts. For example, because of the reliance of low catalyst activity in the second reactor to produce high molecular weights in the second reactor of a Z-N process, chain transfer agents are also ineffective in influencing molecular weight.

While referring to an elastomeric polymer as a product of two or more reactors, usually but not always being reactors in series, the elastomeric polymer is more probably an in-situ blend, being made in at least two reactors. More reactors may be used, and they may be in any configuration, such as additional reactors in series, or one or more reactors in parallel. Additionally, the elastomeric polymer may be a physical blend. No matter how it is made, the elastomeric polymer will have the attributes discussed herein.

Additionally, while we refer to a first elastomeric polymer and a second elastomeric polymer, it will be understood by those of ordinary skill in the art that that this convention is for ease of reference, and should not be taken as limiting. For instance, we contemplate that first could refer to a number (greater than 1) of elastomeric polymers, made for instance, in parallel or series reactors, as long as they had the properties ascribed herein to the first polymer. The same explanation also holds true for the second elastomeric polymer Mooney Viscosity Mooney viscosity is a convenient method to ascribe molecular weight to a polymer. In embodiments of our invention, the first elastomeric polymer will have a Mooney viscosity 80–120, and the second elastomeric polymer will have a Mooney viscosity $\frac{1}{5}$ to $\frac{1}{20}$ that of the first elastomeric polymer.

Ethylene Content

Ethylene content below 95, preferably below 90 mole percent, more preferably below 85 mole percent. More specifically, an ethylene content in the range of from about 70 to 80 weight percent (80–90 mole percent) is most preferable.

α-Olefin Content

The α-olefin or α-olefins included in elastomeric polymers contemplated as a part of the current invention include C3 to C20 α-olefins, preferably C3 to C10, with propylene, butene-1, 4-methyl-1-pentene, hexene-1, and octene-1 being preferred, with propylene being most preferred. The α-olefin or α-olefins included in the elastomeric polymers of the current invention will make up the remainder for the afore mentioned ethylene compositions.

Ethylene Compositional Distribution

While the invention is exemplified with polymers of uniform compositional distribution, it is contemplated that the ethylene composition of the polymer fractions can be differentiated to alter other properties such as tensile strength.

Molecular Weight Distribution

As measured by GPC LALLS etc, the Molecular Weight Distribution (MWD) as expressed by Mw/Mn will be >2, preferably >2.5, more preferably >3, most preferably >3.5.

Compounds for Fabrication Extruded Parts

Extruded shapes manufactured based on the elastomeric polymers of various embodiments of the present invention are made using ingredients, in addition to the elastomeric polymer or polymers, that will be well known to those of ordinary skill in the art. Such ingredients include but are not limited to carbon black, process aids, plasticizer, waxes, reinforcing short fibers, antioxidants, accelerators, curatives, and the like. The combination of these ingredients are known generally as compounds. Use of the term compound in this document will refer to the elastomeric polymer as well as these other common ingredients.

| Parameter | Units | Test |
| --- | --- | --- |
| Mooney Viscosity* (elastomeric polymer content determination)* Ethylene | ML 1 + 4, 125° C., MU % | ASTM D 1646 ASTM D 3900 |
| Ethylidene Norbornene | % | FT. - Infra Red[1] |
| Ethylidene Norbornene | % | FT - Infra Red / N.M.R |
| Mooney Viscosity (compound) | ML 1 + 4, 100° C., MU | ASTM D 1646 |
| Mooney Scorch time | $T_S5$, 125°C., minutes | ASTM D 1646 |
| Oscillating Disk Rheometer (ODR) @ 200° C., 3° arc | | ASTM D 2084 |
| ML | daN · m | |
| MR | daN · m | |
| $T_S2$ | minute | |
| $T_{90}$ | minute | |
| Cure rate | daN · m/minute | |
| Physical Properties press cured 20 min @ 165° C. | | |
| Modulus 100%, 200%, 300% | Mpa | ASTM D 412 - 92 |
| Tensile Strength | Mpa | |
| Elongation at Break | % | |
| Surface Roughness (R) | Surfcom 110B Surface Gauge | Micro meter |
| Extrusion | Haake Rheocord 90 Extruder Temperature = 110 C., 120 RPM Extruder L/D = 20/1 Comp. Screw = 2/1 | |
| Mass Rate | Garvy Die | g/min |
| Screw Speed | | RPM |

*ethylene, alpha-olefin, diene monomer elastomeric polymer
[1]Fourier Transfer

Compound Characteristics
TYPICAL FORMULA USED IN EXTRUSION APPLICATIONS

| INGREDIENTS | phr (weight) |
| --- | --- |
| Elastomeric Polymer | 100 |
| Clay | 45–60 |
| Antioxidant | 1.5 |
| Silane | 1 |
| Zinc Oxide | 5–6 |
| Red Lead | 5 |
| Paraffin Wax | 0–5 |
| LDPE | 0–5 |
| Oil | 0–10 |

Method of Producing Ethylene, Alpha-Olefin Ethylidnenorbornene, Elastomeric Polymer Component Metallocene catalysis of the above monomers is carried out by including a compound capable of activating the Group 4 transition metal compound of the invention to an active catalyst. Suitable activators include the ionizing noncoordinating anion precursor and alumoxane activating compounds, both well known and described in the field of metallocene catalysis.

Additionally, an active, ionic catalyst composition comprising a cation of the Group 4 transition metal compound of the invention and a noncoordinating anion result upon reaction of the Group 4 transition metal compound with the ionizing noncoordinating anion precursor. The activation reaction is suitable whether the anion precursor ionizes the metallocene, typically by abstraction of $R_1$ or $R_2$, by any methods inclusive of protonation, ammonium or carbonium salt ionization, metal cation ionization or Lewis acid ionization. The critical feature of this activation is cationization of the Group 4 transition metal compound and its ionic stabilization by a resulting compatible, noncoordinating, or weakly coordinating (included in the term noncoordinating), anion capable of displacement by the copolymerizable monomers of the invention. See, for example, EP-A-0 277,003, EP-A-0 277,004, U.S. Pat. No. 5,198,401, U.S. Pat. No. 5,241,025, U.S. Pat. No. 5,387,568, WO 91/09882, WO 92/00333, WO 93/11172 and WO 94/03506 which address the use of noncoordinating anion precursors with Group 4 transition metal catalyst compounds, their use in polymerization processes and means of supporting them to prepare heterogeneous catalysts. Activation by alumoxane compounds, typically, alkyl alumoxanes, is less well defined as to its mechanism but is none-the-less well known for use with Group 4 transition metal compound catalysts, see for example U.S. Pat. No. 5,096,867. Each of these U.S. documents are incorporated by reference for purposes of U.S. patent practice.

Syntheses of Examples, which follow, are carried out in a laboratory pilot unit with an output of about 4 Kg/.day. The polymerizations are carried out in a continuous stirred tank reactor or two of the tanks in series. In the case of series reactors the polymer and the unreacted monomers from the first reactor are fed, with additional monomers to a second reactor where the polymerization is continued. The fraction of the polymer made in the first reactor is varies between 20–50%. The residence time in each reactor is about 7–14 minutes.

EXAMPLES

The elastomeric polymers are produced in a laboratory pilot reactor unit with a capacity of about 4 Kg/day using a metallocene dihalide compound alkylated with an activator such as N,N-Dimethylanilinium tetrakis(pentaflurophenyl) boron or N,N-Dimethylanilinium tetrakis (heptafluronaphthyl) boron to yield metallocenes such as dimethylsilyl bis (indenyl) hafnium dimethyl compound or [Cyclopentadienyl(fluorenyl)diphenylmethane]hafnium dimethyl compound. The polymerizations are carried out in a continuous stirred tank or two tanks in series. In the case of tailored reactor configuration, or the inventive configuration, (Examples 3, 4, and 6, the lead reactor is operated at relatively low temperature, that is 20 to 50° C., to facilitate the production of high molecular weight. The polymer and unreacted monomer from the first reactor is fed with additional fresh monomer into the second reactor, where the reaction is continued. The heat of polymerization of the polymer of the first reactor permits the second reactor to operate at a higher temperature than the first reactor (50–100° C.). The effect of the higher reactor temperature in combination with large amounts of a chain transfer agent, in this case hydrogen permits the production of a low molecular weight portion of the polymer chain. The fraction of polymer made in the first reactor, termed polysplit, is varied between 20–50%. Adjustments are made in reactor temperature, catalyst concentration (monomer conversion), polysplit, and chain transfer agent rate, polymers of the desired molecular weight (as expressed by Mooney Viscosity), MWD and composition distribution are made. The residence time in each reactor is about 7–14 minutes, 20–200 kilograms of polymer are produced per gram of catalyst fed to the reactors. Process characteristics are shown in Table 2.

Comparative Examples 1 and 5 are a commercial EPDM Vistalon® 707 which is a nominal 70% ethylene, elastomeric polymer with a MWD of >20 and a very broad CD.

Example 2 (CPU 138B) is an elastomeric polymer typical of metallocene catalyst produced material, with a narrow MWD made in a single reactor. Examples 3 (CPU 187B1) and 4 (CPU 188F) are prepared by the inventive method at two different Mooney Viscosities and polysplit levels. All of the exemplary materials were compounded using a typical Medium Voltage Cable formulation Example 6 (CPU 271B) is synthesized using the same tailoring techniques as described for examples 3 and 4 above, however the process is adjusted to obtain a polymer with similar characteristics to the commercial Vistalon 707 (Example 1 and 5 above). Polymer characteristics are shown in Table 1.

Comparing the extrudate roughness data (Tables 3 and 4), it is clear that the Examples 2 and 3 (single reactor, narrow MWD and inventive process at high Mooney viscosity) both display a high degree of roughness compared to comparative example 1. Examples 4 and 6 at the lower Mooney viscosity match or exceed the extrusion performance of the comparative examples 1 and 5.

CONCLUSION

The present invention has been described in considerable detail with reference to certain preferred versions thereof, other versions are possible. For example, while extrusion processes and compounds have been exemplified, other uses are also contemplated. Therefore, the spirit and scope of the appended claims should not be limited to the description of the preferred versions contained herein.

TABLE 1

Polymer Characteristics

| Polymer | Reactor | Mooney Viscosity ML (1 + 4) 125°C. | Ethylene (wt. %) | Inherent Viscosity (dl/g) | Mw/Mn |
|---|---|---|---|---|---|
| Vistalon 707 | 1 | 24 | 72.0 | 2.6 | >5 |
| CPU 138 B | 1 | 21 | 71.2 | 1.7 | 2.2 |
| CPU 187 B | 1 | 101 | 68.6 | 3 | 2.2 |
|  | 2 | 50 | 76.6 | — | — |
|  | Product | 65 | 72.6 | 2.4 | 2.2 |
| CPU 188 F | 1 | 96 | 72.7 | 3 | 2.5 |
|  | 2 | 5 | 74.3 | — | — |
|  | Product | 10 | 73.8 | 1.5 | 3.4 |
| CPU 271 B | 1 | 87 | 70.8 | 2.9 | 2.4 |
|  | 2 | 12 | 72.9 | — | — |
|  | Product | 22 | 72.3 | 1.8 | 3.6 |

(1) Reactor 1 polymer characteristics measured from polymer made in Reactor 1.
(2) Reactor 2 polymer characteristics calculated from polymer made in Reactor 1, final product and polysplit.
(3) Product polymer characteristics correspond to the final product used in the compound evaluations.
(4) Mw = Weight Average Molecular Weight, Light Scattering Methods.
(5) Mn = Number Average Molecular Weight, Size Exclusion Chromatography.

TABLE 2

Process Characteristics

| Polymer | Reactor | Temperature (C.) | Catalyst Efficiency | Polysplit |
|---|---|---|---|---|
| Vistalon 707 | 1 | — | — | — |
| CPU 138 B | 1 | 65 | 31 | 100 |
| CPU 187 B | 1 | 46 | 9 | 20 |
|  | 2 | 70 | 19 | 80 |
| CPU 188 F | 1 | 35 | 6 | 24 |
|  | 2 | 72 | 17 | 76 |
| CPU 271 B | 1 | 50 | 5 | 45 |
|  | 2 | 70 | 16 | 55 |

(1) Polysplit = Percent of polymer made in that reactor.
(2) Reactor 2 catalyst efficiency measured on total basis.

TABLE 3

Cure Characteristics and Processability of Medium Voltage Formulations

| | | EXAMPLE | | | |
|---|---|---|---|---|---|
| | | 1 | 2 | 3 | 4 |
| Polymer | | V707 | CPU 138 B | CPU 187 B | CPU 188F |
| Compound Mooney Viscosity (1 + 4) 125° C. | MU | 24 | 27 | 59 | 12 |
| ODR 200° C., 3° Arc | | | | | |
| $M_L$ | dN · m | 7 | 7 | 20 | 3 |
| $M_H$ | dN · m | 50 | 94 | 116 | 49 |
| $t_2$ | min. | 0.8 | 0.5 | 0.5 | 1.0 |
| $t_{90}$ | min. | 1.9 | 1.6 | 1.5 | 2.1 |
| Cure Rate | dN · m/min | 46.3 | 105 | 131 | 57 |
| $M_H$–$M_L$ | dN · m | 43 | 87 | 96 | 46 |
| Press Cure, 20 min @ 165° C. | | | | | |
| Hardness | Shore A | 83 | 80 | 87 | 85 |
| 100% Modulus | MPa | 4.0 | 4.5 | 6.0 | 4.4 |
| 200% Modulus | MPa | 6.3 | 8.8 | 10.8 | 7.4 |
| 300% Modulus | MPa | 7.3 | — | — | — |
| Tensile Strength | MPa | 7.6 | 10.0 | 12.2 | 8.2 |

TABLE 3-continued

Cure Characteristics and Processability of Medium Voltage Formulations

|  |  | EXAMPLE | | | |
|---|---|---|---|---|---|
|  |  | 1 | 2 | 3 | 4 |
| Elongation | % | 415 | 255 | 270 | 285 |
| Extrudate Roughness, $R_t$ | μm | | | | |
| 13 (mm/min) | | 9 | 28 | 87 | 26 |
| 51 | | 22 | 83 | 46 | 17 |
| 76 | | 24 | 94 | 91 | 14 |
| Extrudate Roughness, $R_s$ | μm | | | | |
| 13 (mm/min) | | | 1.3 | | 3.0 |
| 51 | | | 2.9 | | 1.2 |
| 76 | | | 3.1 | | 1.4 |

TABLE 4

Cure Characteristics and Processability of Medium Voltage Formulations with CPU 271 B

|  |  | EXAMPLE | |
|---|---|---|---|
|  |  | 5 | 6 |
| Polymer | | V707 | CPU 271 B |
| Compound Mooney Viscosity (1 + 4) 125° C. | MU | 25 | 23 |
| ODR 200° C., 3° Arc | | | |
| $M_L$ | DN · m | 7 | 7 |
| $M_H$ | DN · m | 56 | 63 |
| $t_2$ | min. | 0.6 | 0.6 |
| $t_{90}$ | min. | 1.6 | 1.7 |
| Cure Rate | dN · m/min | 63 | 70 |
| $M_H$–$M_L$ | dN · m | 49 | 56 |
| Press Cure, 20 min @165° C. | | | |
| Hardness | Shore A | 81 | 80 |
| 100% Modulus | MPa | 3.8 | 3.8 |
| 200% Modulus | MPa | 6.1 | 6.8 |
| 300% Modulus | MPa | 7.4 | — |
| Tensile Strength | MPa | 7.5 | 8.3 |
| Elongation | % | 320 | 285 |
| Extrudate Roughness, $R_t$ | μm | | |
| 13 (mm/min) | | 8 | 11 |
| 25 | | 10 | 14 |
| 51 | | 16 | 18 |
| 76 | | 20 | 13 |
| Extrudate Roughness, $R_s$ | μm | | |
| 13 (mm/min) | | 0.9 | 1.3 |
| 25 | | 1.2 | 1.5 |
| 51 | | 2.2 | 2.3 |
| 76 | | 2.6 | 1.8 |

What we claim is:

1. An ethylene, α-olefin elastomeric polymer composition exhibiting improved processability when extruded in a compound, comprising:
   a) at least a first ethylene, α-olefin elastomeric polymer, said first elastomeric polymer having:
      i) said ethylene present in said elastomeric polymer in the range of from about 70–80 weight percent;
      ii) said α-olefin making up the remainder of the elastomeric polymer;
   said first elastomeric polymer having a Mooney viscosity in the range of from 80–120 (ML 1+4 @125° C.), and
   b) at least a second ethylene, α-olefin elastomeric polymer, said second elastomeric polymer having;
      i) said ethylene present in said elastomeric polymer in the range of from about 40–80 weight percent;
      ii) said α-olefin making up the remainder of the elastomeric polymer;
   said second elastomeric polymer having a Mooney viscosity from 1/5 to 1/20 of that of said first elastomeric polymer.

2. The elastomeric polymer composition of claim 1 wherein said first elastomeric polymer is present in said elastomeric polymer the range of from about 20–50 weight percent and said second elastomeric polymer is present in the range of 50–80 weight percent, both based on the total weight of said elastomeric polymer compostion.

3. The elastomeric polymer composition of claim 1 wherein said first and said second elastomeric polymers have a Mw/Mn of from 2–4.

4. The elastomeric polymer composition of claim 1 wherein said elastomeric polymer composition has an Mw/Mn>2.

5. The elastomeric polymer composition of claim 1 wherein said elastomeric polymer composition has an Mw/Mn>3.5.

6. The elastomeric polymer composition of claim 1 wherein said elastomeric polymer composition has a metal content, as determined by X-ray fluorescence, less than 0.01 weight percent.

7. The elastomeric polymer composition of claim 1 wherein said elastomeric polymer composition is substantially free of calcium.

8. The elastomeric polymer composition according to claim 1, wherein the alpha olefin is propylene.

9. The elastomeric polymer composition according to claim 1 made with a metallocene catalyst.

10. An ethylene, α-olefin elastomeric polymer composition exhibiting improved processability when extruded in a compound, comprising:
   a) at least a first ethylene, α-olefin elastomeric polymer, said first elastomeric polymer having:
      i) said ethylene present in said elastomeric polymer in the range of from about 70–80 weight percent;
      ii) said α-olefin making up the remainder of the elastomeric polymer;
   said first elastomeric polymer having a Mooney viscosity in the range of from 80–120 (ML 1+4 @ 125° C.), said first elastomeric polymer present in said elastomeric polymer in the range of from about 20–50 weight percent; and
   b) at least a second ethylene, α-olefin elastomeric polymer, said second elastomeric polymer having;
      i) said ethylene present in said elastomeric polymer in the range of from about 40–80 weight percent;
      ii) said α-olefin making up the remainder of the elastomeric polymer;
   said second elastomeric polymer having a Mooney viscosity from 1/5 to 1/20 of that of said first elastomeric polymer;
   said second elastomeric polymer being present in the range of 50–80 weight percent based on the total weight of said elastomeric polymer;
   said first and said second elastomeric polymers having a Mw/Mn from 2–4; and
   said elastomeric polymer having Mw/Mn>2.

11. The elastomeric polymer composition according to claim 10, further having a metal content, as determined by X-ray fluorescence, less than 0.01 weight percent.

12. The elastomeric polymer composition according to claim 10, further being substantially free of calcium.

13. The elastomeric polymer composition according to claim 10, wherein the alpha olefin is propylene.

14. The elastomeric polymer composition according to claim 10 made with a metallocene catalyst.

15. An ethylene, α-olefin elastomeric polymer composition exhibiting improved processability when extruded in a compound, comprising:

a) at least a first ethylene, α-olefin elastomeric polymer, said first elastomeric polymer having:
  i) said ethylene present in said elastomeric polymer in the range of from about 70–80 weight percent;
  ii) said α-olefin making up the remainder of the elastomeric polymer;
said first elastomeric polymer having a Mooney viscosity in the range of from 80–120 (ML 1+4 @ 125° C.), said first elastomeric polymer present in said elastomeric polymer in the range of from about 20–50 weight percent; and
b) at least a second ethylene, α-olefin elastomeric polymer, said second elastomeric polymer having;
  i) said ethylene present in said elastomeric polymer in the range of from about 40–80 weight percent;
  ii) said α-olefin making up the remainder of the elastomeric polymer;
said second elastomeric polymer having a Mooney viscosity from ⅕ to ¹⁄₂₀ of that of said first elastomeric polymer;
  said second elastomeric polymer being present in the range of 50–80 weight percent based on the total weight of said elastomeric polymer;
  said first and said second elastomeric polymers having a Mw/Mn from 2–4;
  said elastomeric polymer composition having a Mw/Mn>2,
  having a metal content, as determined by X-ray fluorescence, of less than 0.01 weight percent, and
being substantially free of calcium, and
wherein the alpha olefin is propylene and said elastomeric polymer composition is made with a metallocene catalyst.

* * * * *